(12) United States Patent
Wu et al.

(10) Patent No.: US 12,147,275 B2
(45) Date of Patent: Nov. 19, 2024

(54) SEAMLESS DUAL SCREEN HINGE

(71) Applicant: Dell Products L.P., Round Rock, TX (US)

(72) Inventors: Chin-Chung Wu, New Taipei (TW); Chih-Ping Chang, Taipei (TW); An-Chung Hsieh, New Taipei (TW); Shih-Heng Chen, Taipei (TW)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 17/872,073

(22) Filed: Jul. 25, 2022

(65) Prior Publication Data

US 2024/0028087 A1    Jan. 25, 2024

(51) Int. Cl.
*G06F 1/16* (2006.01)
*F16C 11/04* (2006.01)
(52) U.S. Cl.
CPC ............ *G06F 1/1681* (2013.01); *F16C 11/04* (2013.01); *G06F 1/1616* (2013.01)
(58) Field of Classification Search
CPC ..... G06F 1/1616; G06F 1/1681; H04M 1/022
See application file for complete search history.

(56) References Cited

U.S. PATENT DOCUMENTS

| | | | |
|---|---|---|---|
| 2018/0230726 A1* | 8/2018 | Chen | E05D 11/10 |
| 2019/0163241 A1* | 5/2019 | Moon | G06F 1/1641 |
| 2023/0409090 A1* | 12/2023 | Hong | G09F 9/30 |
| 2024/0040723 A1* | 2/2024 | Feng | F16C 11/04 |

* cited by examiner

*Primary Examiner* — James Wu
*Assistant Examiner* — Dakota M Talbert
(74) *Attorney, Agent, or Firm* — Jackson Walker L.L.P.

(57) ABSTRACT

An information handling system may include a first member, a second member, and one or more hinge assemblies for coupling the first and second members, where the one or more hinge assemblies comprise a central assembly, a first and a second orbit mechanism configured to couple to the first and second members respectively, a first primary shaft coupling a first pair of link bars to the central assembly and to each other, a first secondary shaft coupling the first pair of link bars to each other and to the first orbit mechanism via a first track comprising an elongated opening, a second primary shaft coupling a second pair of link bars to the central assembly and to each other, and a second secondary shaft coupling the second pair of link bars to each other and to the second orbit mechanism via a second track comprising an elongated opening.

18 Claims, 10 Drawing Sheets

SEAMLESS DUAL SCREEN HINGE

TECHNICAL FIELD

The present disclosure relates in general to information handling systems, and more particularly to a hinge that enables an information handling system with a seamless dual screen display.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Because of their mobility, consumers of information handling systems increasingly use laptops. A laptop, often referred to as a "notebook", may be a small, portable information handling system with a "clamshell" form factor including a keyboard assembly on a lower portion of the clamshell and a display assembly comprising a thin liquid crystal display screen or light-emitting diode display screen on an upper portion of the clamshell, with the keyboard assembly mechanically coupled to the display assembly via a mechanical hinge. Accordingly, the keyboard assembly and the display assembly may be rotated to an open position in order for a user to use the laptop. Conversely, a user may fold a laptop into its closed position for transportation, and thus may be suitable for mobile use.

Information handling systems may also include a second display assembly comprising a thin liquid crystal display screen or light-emitting diode display screen, instead of or in addition to a keyboard assembly, on the lower portion of the clamshell, forming a "dual screen." Customers of "dual screen" notebooks prefer such displays for increased productivity. However, typical dual screen designs often have large gaps between the display assemblies due to mechanical hinges. Such gaps are aesthetically unappealing and impede finger or stylus movement from one display assembly to the next.

Consequently, customers of "dual screen" notebook information handling systems often desire thin, sleek, and functional form factors. Accordingly, systems and methods are desired to enable a hinge solution reducing the visual gap between display assemblies in dual screen notebooks.

SUMMARY

In accordance with the teachings of the present disclosure, the disadvantages and problems associated with existing approaches to hingedly coupling dual screen displays of information handling systems may be reduced or eliminated.

In accordance with embodiments of the present disclosure, an information handling system may include a first member, a second member, and one or more hinge assemblies for rotatably coupling the first member to the second member, wherein the one or more hinge assemblies comprises a central assembly, a first orbit mechanism configured to mechanically couple to the first member, a second orbit mechanism configured to mechanically couple to the second member, a first pair of link bars, a first primary shaft rotatably coupling the first pair of link bars to the central assembly and mechanically coupling the first pair of link bars to each other, a first secondary shaft mechanically coupling the first pair of link bars to each other and rotatably coupling the first pair of link bars to the first orbit mechanism via a first track comprising an elongated opening formed through the first orbit mechanism which limits linear motion of the first secondary shaft relative to the first orbit mechanism, wherein an axis of rotation of the first primary shaft is generally parallel to an axis of rotation of the first secondary shaft, a second pair of link bars, a second primary shaft rotatably coupling the second pair of link bars to the central assembly and mechanically coupling the second pair of link bars to each other, and a second secondary shaft mechanically coupling the second pair of link bars to each other and rotatably coupling the second pair of link bars to the second orbit mechanism via a second track comprising an elongated opening formed through the second orbit mechanism which limits linear motion of the second secondary shaft relative to the second orbit mechanism, wherein an axis of rotation of the second primary shaft is generally parallel to an axis of rotation of the second secondary shaft.

In accordance with these and other embodiments of the present disclosure, a hinge assembly for rotatably coupling a first member to a second member may be provided, the hinge assembly comprising a central assembly, a first orbit mechanism configured to mechanically couple to the first member, a second orbit mechanism configured to mechanically couple to the second member, a first pair of link bars, a first primary shaft rotatably coupling the first pair of link bars to the central assembly and mechanically coupling the first pair of link bars to each other, a first secondary shaft mechanically coupling the first pair of link bars to each other and rotatably coupling the first pair of link bars to the first orbit mechanism via a first track comprising an elongated opening formed through the first orbit mechanism which limits linear motion of the first secondary shaft relative to the first orbit mechanism, wherein an axis of rotation of the first primary shaft is generally parallel to an axis of rotation of the first secondary shaft, a second pair of link bars, a second primary shaft rotatably coupling the second pair of link bars to the central assembly and mechanically coupling the second pair of link bars to each other, and a second secondary shaft mechanically coupling the second pair of link bars to each other and rotatably coupling the second pair of link bars to the second orbit mechanism via a second track comprising an elongated opening formed through the second orbit mechanism which limits linear motion of the second secondary shaft relative to the second orbit mechanism, wherein an axis of rotation of the second primary shaft is generally parallel to an axis of rotation of the second secondary shaft.

In accordance with these and other embodiments of the present disclosure, a method for forming a hinge assembly for rotatably coupling a first member to a second member may include mechanically coupling a first orbit mechanism to the first member, mechanically coupling a second orbit to the second member, rotatably coupling the first pair of link bars to a central assembly via a primary shaft, mechanically coupling the first pair of link bars to each other via the primary shaft, mechanically coupling the first pair of link bars to each other via a first secondary shaft, rotatably coupling the first pair of link bars to the first orbit mechanism via the first secondary shaft and a first track comprising an elongated opening formed through the first orbit mechanism which limits linear motion of the first secondary shaft relative to the first orbit mechanism, wherein an axis of rotation of the first primary shaft is generally parallel to an axis of rotation of the first secondary shaft, rotatably coupling the second pair of link bars to the central assembly via a second pair of link bars, mechanically coupling the second pair of link bars to each other via the second pair of link bars, mechanically coupling the second pair of link bars to each other via a second secondary shaft, and rotatably coupling the second pair of link bars to the second orbit mechanism via the second secondary shaft and a second track comprising an elongated opening formed through the second orbit mechanism which limits linear motion of the second secondary shaft relative to the second orbit mechanism, wherein an axis of rotation of the second primary shaft is generally parallel to an axis of rotation of the second secondary shaft.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 7D, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
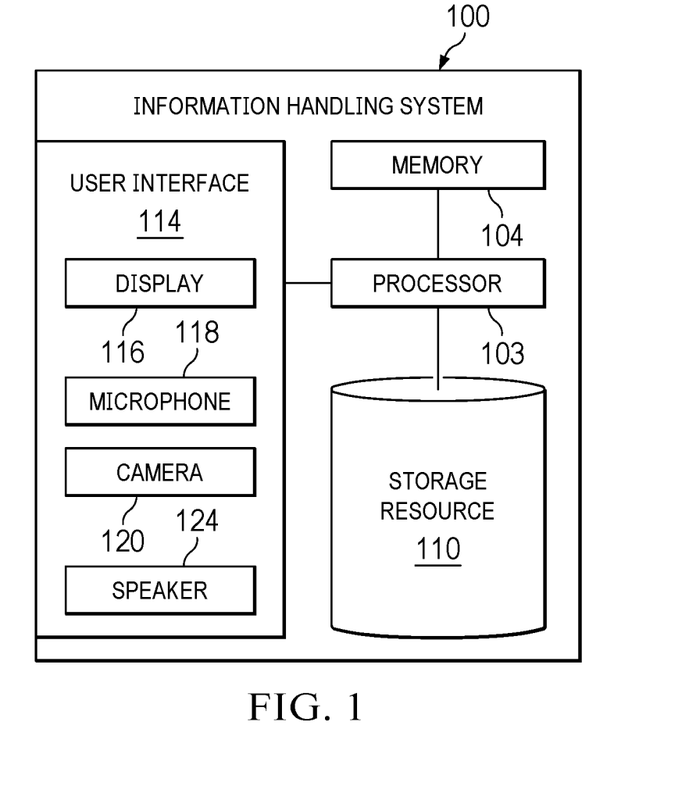
FIG. 1 illustrates a functional block diagram of selected components of an example information handling system, in accordance with embodiments of the present disclosure.

FIG. 1 illustrates a functional block diagram of selected components of an example information handling system 100, in accordance with embodiments of the present disclosure. In some embodiments, information handling system 100 may be a personal computer (e.g., a desktop computer or a portable computer). In other embodiments, information handling system 100 may comprise a mobile device (e.g., smart phone, a tablet computing device, a handheld computing device, a personal digital assistant, or any other device that may be readily transported on a person of a user of such mobile device).

As depicted in FIG. 1, information handling system 100 may include a processor 103, a memory 104 communicatively coupled to processor 103, a storage resource 110 communicatively coupled to processor 103, and a user interface 114 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 110, and/or another component of information handling system 100.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 100 is turned off.

Storage resource 110 may include a system, device, or apparatus configured to store data. Storage resource 110 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 110 may include one or more storage enclosures configured to hold and/or power one or more of such devices. In the embodiments represented by FIG. 1, storage resource 110 may reside within information handling system 100. However, in other embodiments, storage resource 110 may reside external to information handling system 100 (e.g., may be coupled to information handling system 100 via a network).

User interface 114 may comprise any instrumentality or aggregation of instrumentalities by which a user may interact with information handling system 100. For example, user interface 114 may permit a user to input data and/or instructions into information handling system 100 (e.g., via a keypad, keyboard, touch screen, microphone, camera, and/or other data input device), and/or otherwise manipulate information handling system 100 and its associated components. User interface 114 may also permit information handling system 100 to communicate data to a user (e.g., via a display device, speaker, and/or other data output device). As shown in FIG. 1, user interface 114 may include one or more of a display 116, microphone 118, camera 120, and speaker 124.

Display 116 may comprise any suitable system, device, or apparatus configured to display human-perceptible graphical data and/or alphanumeric data to a user. For example, in some embodiments, display 116 may comprise a liquid crystal display.

Microphone 118 may comprise any system, device, or apparatus configured to convert sound incident at microphone 118 to an electrical signal that may be processed by processor 103. In some embodiments, microphone 118 may include a capacitive microphone (e.g., an electrostatic microphone, a condenser microphone, an electret microphone, a microelectromechanical systems (MEMS) microphone, etc.) wherein such sound is converted to an electrical signal using a diaphragm or membrane having an electrical capacitance that varies as based on sonic vibrations received at the diaphragm or membrane.

Camera 120 may comprise any system, device, or apparatus configured to record images (moving or still) into one or more electrical signals that may be processed by processor 103.

Speaker 124 may comprise any system, device, or apparatus configured to produce sound in response to electrical audio signal input.

In addition to processor 103, memory 104, storage resource 110, and user interface 114, information handling system 100 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
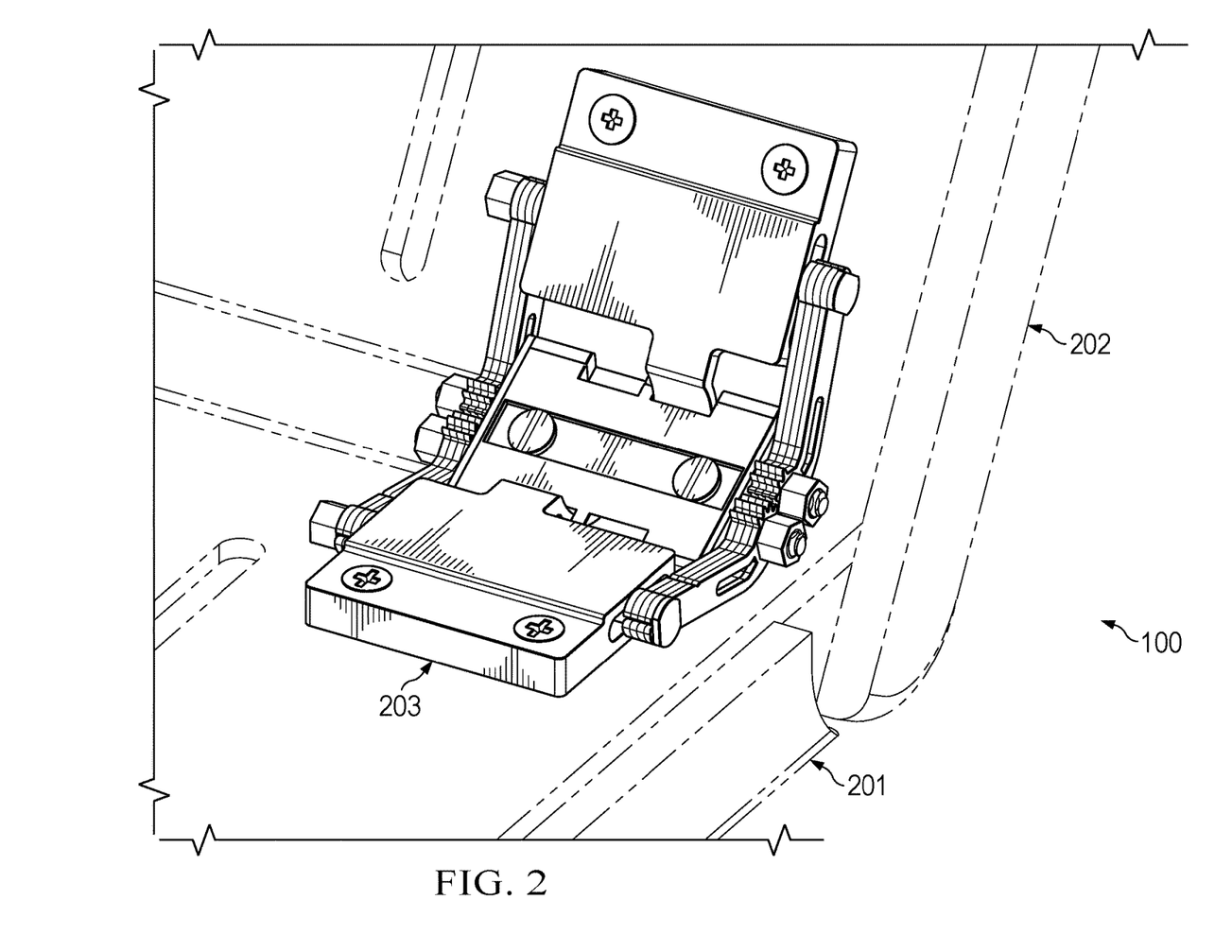
FIG. 2 illustrates an isometric perspective view of selected components of an example information handling system with portions removed for purposes of clarity and exposition, in accordance with embodiments of the present disclosure.

FIG. 2 depicts an isometric perspective view of selected components of example information handling system 100, with portions of the information handling system 100 removed for purposes of clarity and exposition, in accordance with embodiments of the present disclosure. As depicted in FIG. 2, information handling system 100 may comprise a first member 201 and a second member 202 hingedly coupled to each other via a hinge assembly 203. In other non-limiting embodiments, information handling system 100 may further comprise display assemblies mechanically coupled to members 201 and 202. In such embodiments, hinge assembly 203 may be positioned beneath these display assemblies such that hinge assembly 203 may not be visible. In other non-limiting embodiments, hinge assembly 203 may be enclosed by member 201 and member 202.

In operation, information handling system 100 may be rotated about hinges (e.g., hinge assembly 203 shown in FIG. 2) between a closed position (e.g., a position of first member 201 relative to second member 202 such that first member 201 substantially overlays second member 202, or vice versa) and an open position (e.g., a position of first member 201 relative to second member 202 such that first member 201 does not substantially overlay second member 202, or vice versa, such as when the angle formed by first member 201 and second member 202 at hinge assembly 203 is substantially non-zero). In some embodiments, information handling system 100 may be configured to allow for 180 degrees of rotation of first member 201 relative to second member 202 or vice versa (e.g., zero degrees in the closed position and 180 degrees in a "flat" configuration).

As used herein, the "open" state may refer generally to any state other than the "closed" state. In some instances, the "open" state may also be referred to as a "flat" or "maximum extension" state. Accordingly, information handling system 100 may have multiple positions in the "open" state.

Figure 3:
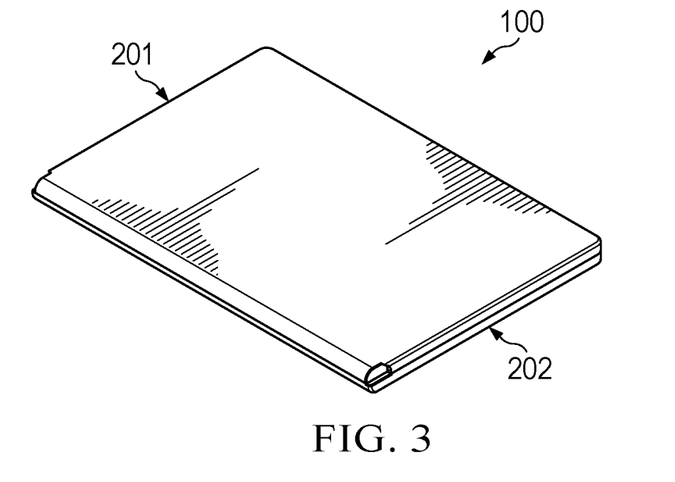
FIGS. 3-5 illustrate several views of the example information handling system of FIG. 2, in accordance with embodiments of the present disclosure.
Figure 4:
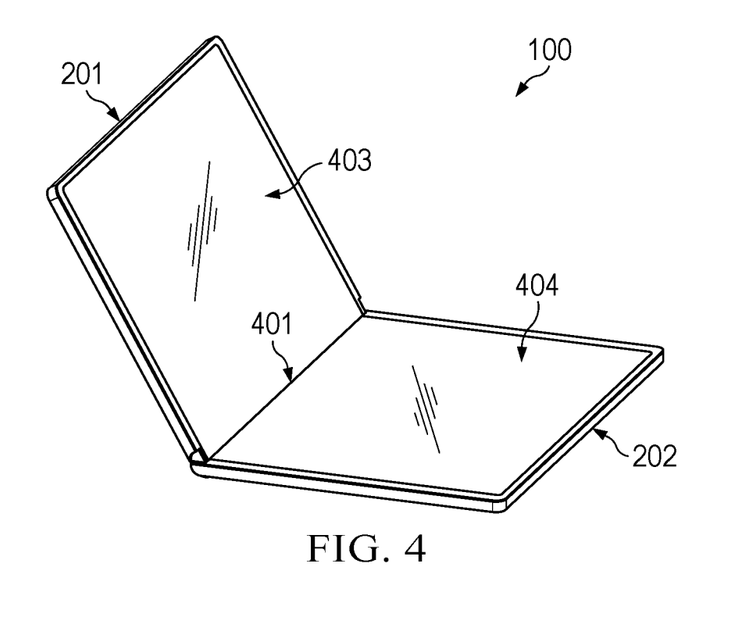
Figure 5:
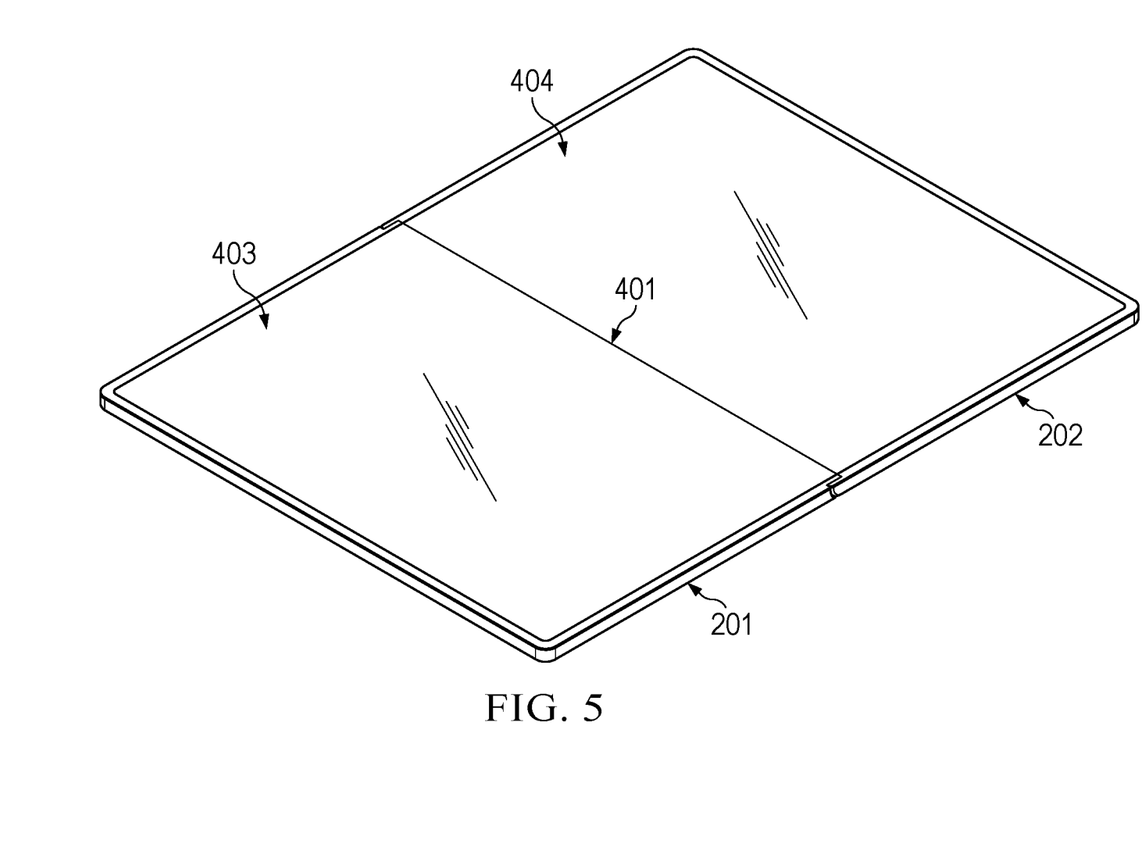

Turning now to FIGS. 3-5, additional views of example information handling system 100 of FIG. 2 are provided. FIG. 3 shows an isometric perspective view of the example information handling system 100 in a closed position, in accordance with the embodiments of the present disclosure. FIG. 4 shows an isometric perspective view of information handling system 100 in an open position, in accordance with the embodiments of the present disclosure. FIG. 5 shows an isometric perspective view of information handling system 100 in a flat position, in accordance with the embodiments of the present disclosure. As illustrated in FIGS. 3-5, information handling system 100 may be configured to allow for 180 degrees of rotation of first member 201 relative to second member 202 or vice versa (e.g., zero degrees in the closed position and 180 degrees in a "flat" configuration). Information handling system 100 may further be configured such that the distance between display assembly 403 and display assembly 404 along edge 401 is minimized such that display assembly 403 and display assembly 404 appear substantially continuous. In other words, a distance between one edge of display assembly 403 and one edge of display assembly 404 in the closed position may be approximately equal to a distance between such edges of display assembly 403 and display assembly 404 in the flat configuration.

Each of display assembly 403 and display assembly 404 may have an enclosure made from one or more suitable materials, including without limitation plastic, steel, and/or aluminum. Although information handling system 100 is shown in FIGS. 3-5 as having certain components (e.g., display assemblies 403 and 404), information handling system 100 may include any other suitable components, including but not limited to a keyboard assembly, which may not have been depicted in FIGS. 3-5 for the purposes of clarity and exposition.

Figure 6A:
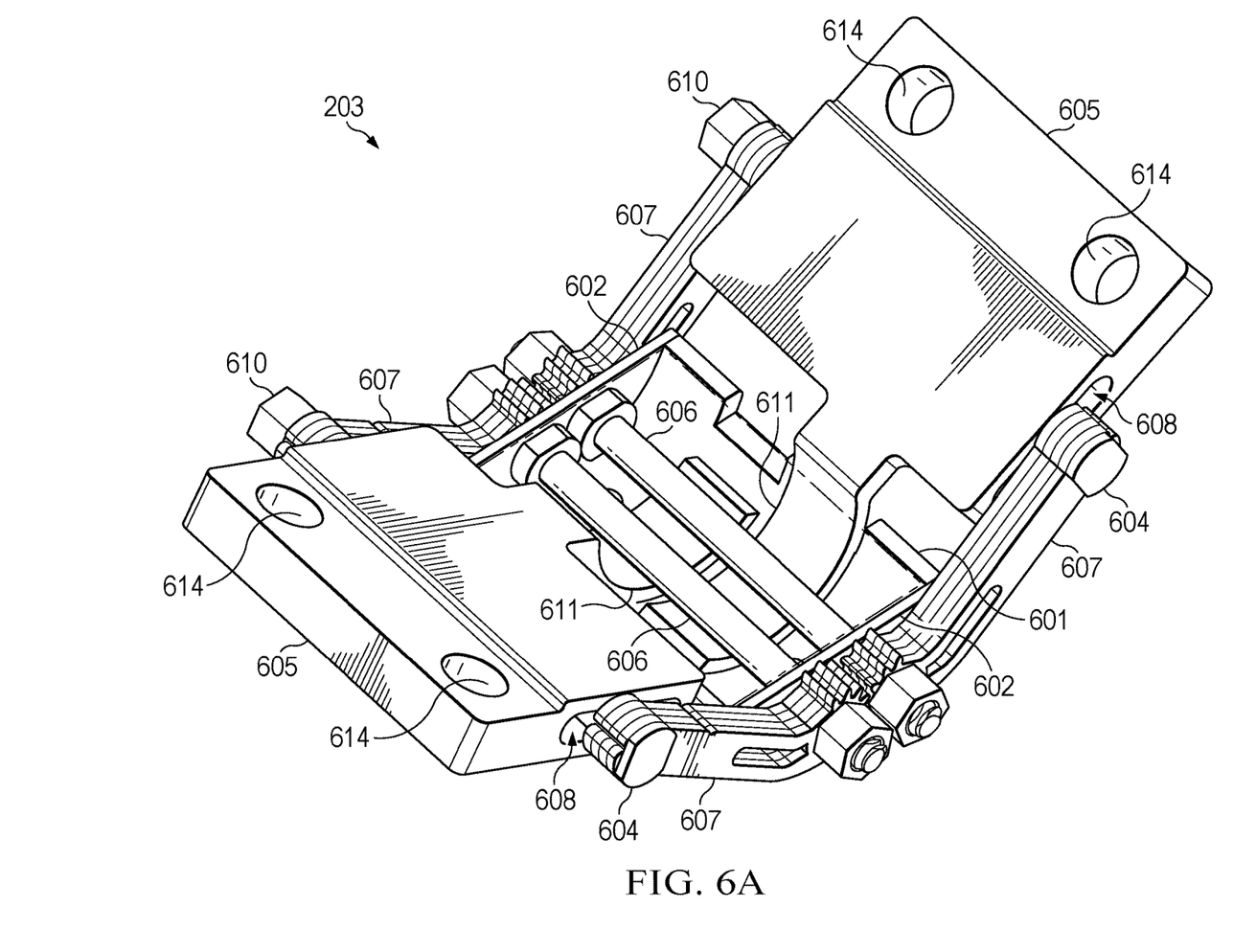
FIG. 6A illustrates an isometric perspective view of a hinge of the example information handling system of FIG. 2, in accordance with embodiments of the present disclosure.
Figure 6B:
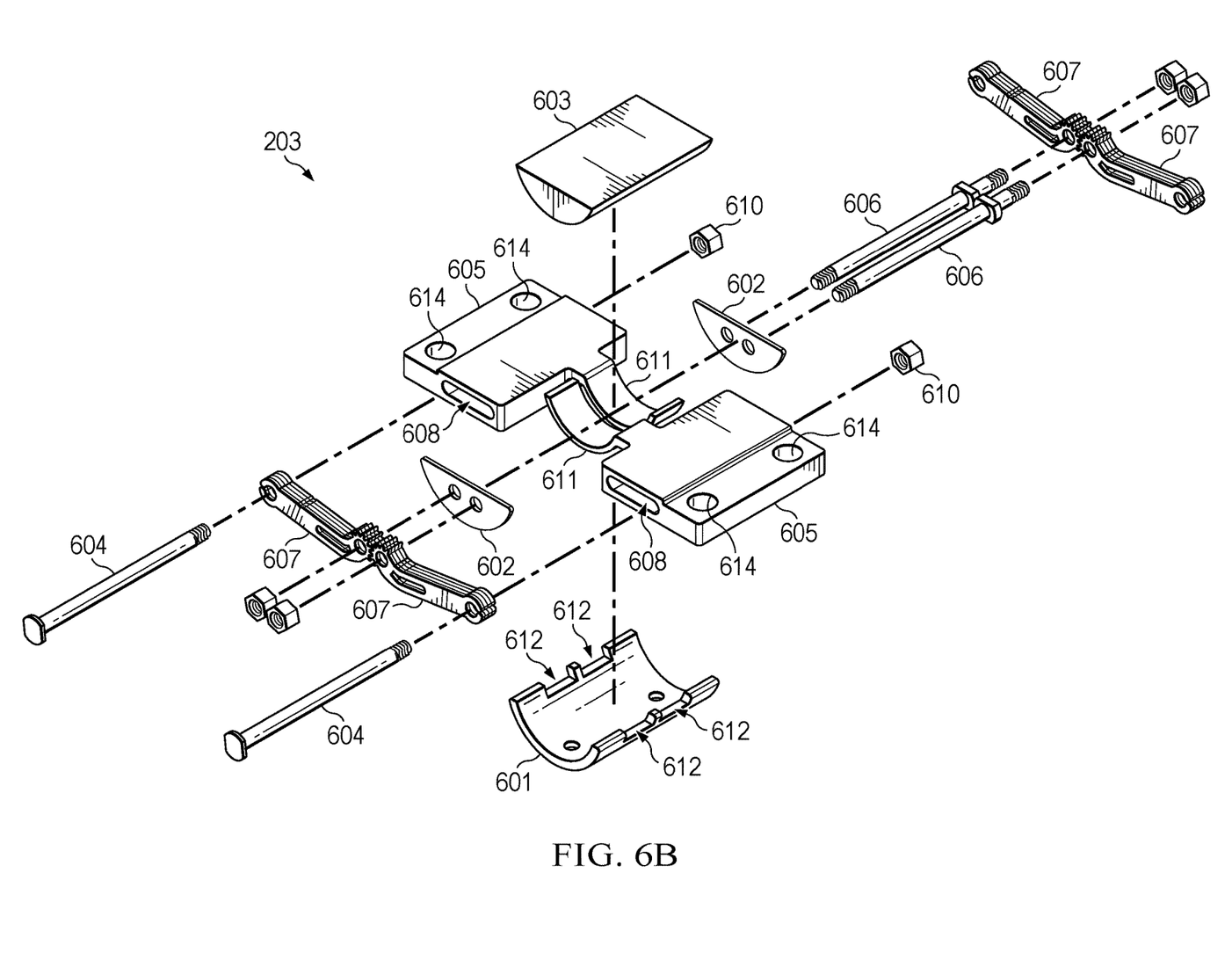
FIG. 6B illustrates an exploded isometric perspective view of various components of a hinge of the example information handling system of FIG. 2, in accordance with embodiments of the present disclosure.

FIG. 6A illustrates an isometric perspective view of hinge assembly 203 of example information handling system 100 of FIG. 2, in accordance with the embodiments of the present disclosure. FIG. 6B illustrates an exploded isometric perspective view of various components of hinge assembly 203 of example information handling system 100 of FIG. 2, in accordance with the embodiments of the present disclosure. As depicted in FIGS. 6A and 6B, hinge assembly 203 may comprise a central assembly for mechanically linking opposite halves of hinge assembly 203, such central assembly comprising a generally semicylindrical base 601, two opposing sides 602, and a cap 603, arranged as shown in FIGS. 6A and 6B. In some embodiments, such central assembly may form a generally enclosed space.

During operation of hinge assembly 203, the central assembly may remain in a fixed position, with other mechanical components of hinge assembly 203 moving relative to the central assembly. As shown in FIGS. 6A and 6B, hinge assembly 203 may include two halves, each half generally symmetrical to the other and each half comprising a primary shaft 606, a secondary shaft 604, a pair of opposite link bars 607, an orbit mechanism 605, and a fastener 610.

A primary shaft 606 may be mechanically coupled to the central assembly via openings formed within sides 602 and/or cap 603, such that primary shaft 606 extends through both sides 602. A first end of each of opposite link bars 607 may rotatably couple to primary shaft 606, such that each link bar 607 may rotate about a first axis of rotation defined by primary shaft 606. The coupling of opposite link bars 607 to opposite ends of primary shaft 606 may also provide a mechanical force to mechanically couple base 601, sides 602, and cap 603 together to form the central assembly.

A second end of each of opposite link bars 607 may also rotatably couple to a secondary shaft 604, such that each link bar 607 may rotate about a second axis of rotation defined by secondary shaft 604, and such that the first axis of rotation defined by primary shaft 606 and the second axis of rotation defined by the secondary shaft 604 are substantially parallel. Accordingly, a link bar 607 may comprise two opposite ends separated by a body or web, where a first end may be mechanically coupled to primary shaft 606 and a second end may be mechanically coupled to secondary shaft 604. As shown in FIGS. 6A and 6B, a fastener 610 (e.g., a threaded bolt) may be mechanically coupled to one end of secondary shaft 604 in order to maintain mechanical coupling of secondary shaft 604 to link bars 607. As further shown in FIGS. 6A and 6B, when hinge assembly 203 is assembled, secondary shaft 604 may pass through a track 608 of orbit mechanism 605, thus mechanically coupling orbit mechanism 605 between link bars 607.

As shown in FIGS. 6A and 6B, track 608 may comprise an elongated opening extending entirely through the width of orbit mechanism 605, such that track 608 may mechanically constrain a range of motion of orbit mechanism 605 relative to secondary shaft 604. In other words, track 608 may limit a range of linear movement of secondary shaft 604 relative to orbit mechanism 605.

As also shown in FIGS. 6A and 6B, orbit mechanism 605 may include a flange 611 with a curved shape that conforms to a shape of base 601, such that when hinge assembly 203 is assembled, such flange 611 may pass through a corresponding opening 612 of base 601 and base 601 may guide rotation of orbit mechanism 605 relative to the central assembly.

As additionally shown in FIGS. 6A and 6B, orbit mechanism 605 may include a plurality of threaded inserts 614 or other mechanical features for mechanically coupling to one of first member 201 or second member 202 via a screw or other fastener. In other words, an orbit mechanism 605 of one half of hinge assembly 203 may mechanically couple via threaded inserts 614 to first member 201 and the other half of hinge assembly 203 may mechanically couple via threaded inserts 614 to second member 202, or vice versa.

Primary shaft 606 may be configured to remain stationary relative to the central assembly, and orbit mechanism 605 may be configured to rotate relative to primary shaft 606. Further, secondary shaft 604 may be configured such that it moves from one end of track 608 to the opposite end of track 608 as orbit mechanism 605 rotates relative to primary shaft 606. Accordingly, when first member 201 and second member 202 are mechanically coupled to one another via hinge assembly 203, first member 201 may rotate relative to second member 202 or vice versa as orbit mechanisms 605 rotate relative to their respective primary shafts 606.

Turning now to FIGS. 7A-7D, side elevation views are shown of example information handling system 100 depicting operation of hinge assembly 203, in accordance with embodiments of the present disclosure. FIGS. 7A-7D also illustrate the motions of various components of hinge assembly 203 as information handling system 100 is translated (e.g., by a mechanical force applied by a user) from a closed position to an open position. To facilitate understanding of the relationships between components, the movement of hinge assembly 203 will be discussed in stages, but in practice, the movements of all stages may occur simultaneously to control all degrees of freedom and provide predictable motion.

Figure 7A:
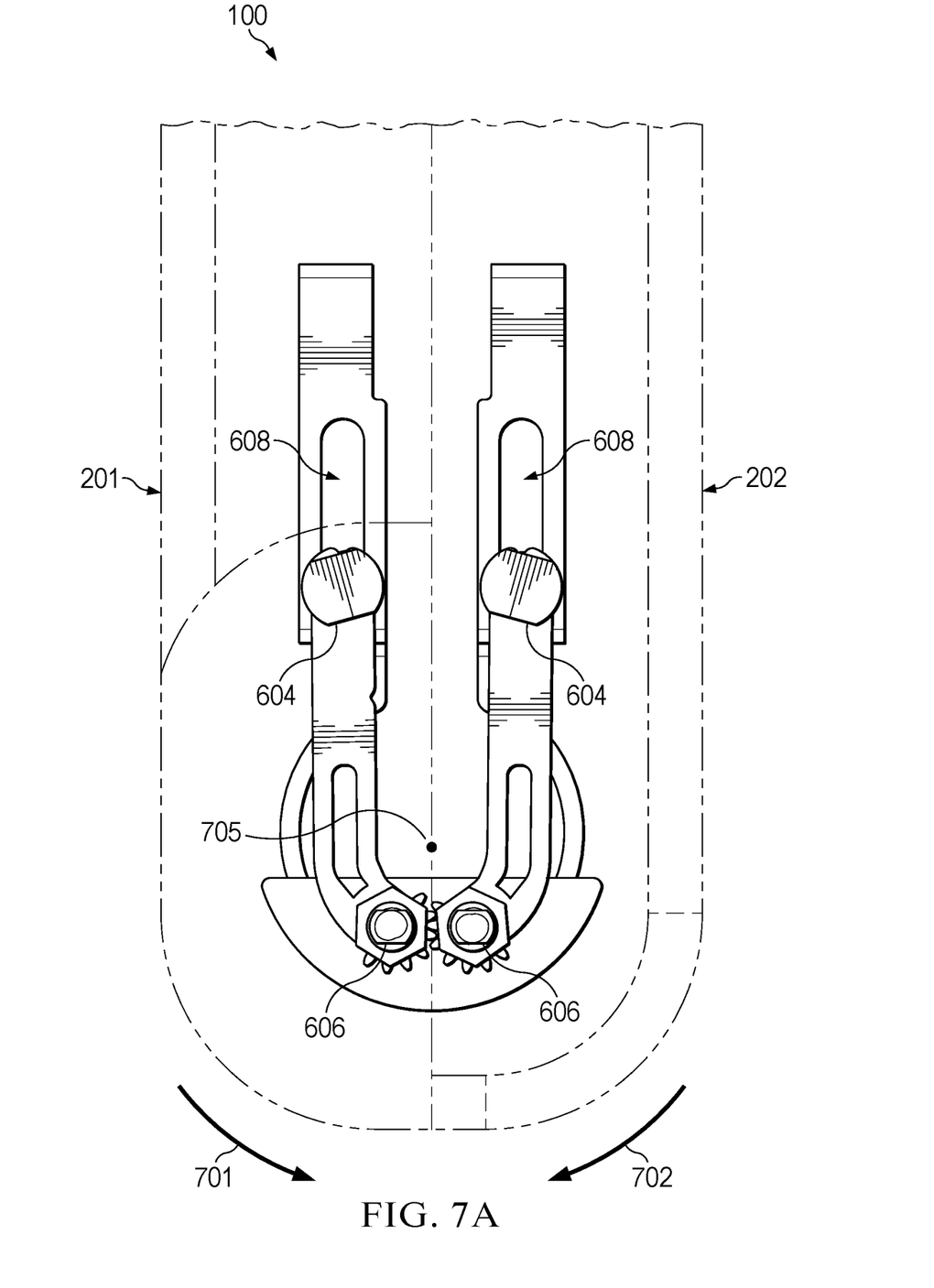
FIGS. 7A-7D illustrate various side elevation views of the mechanism of operation of a hinge of the example information handling system of FIG. 2, in accordance with embodiments of the present disclosure.
Figure 7B:
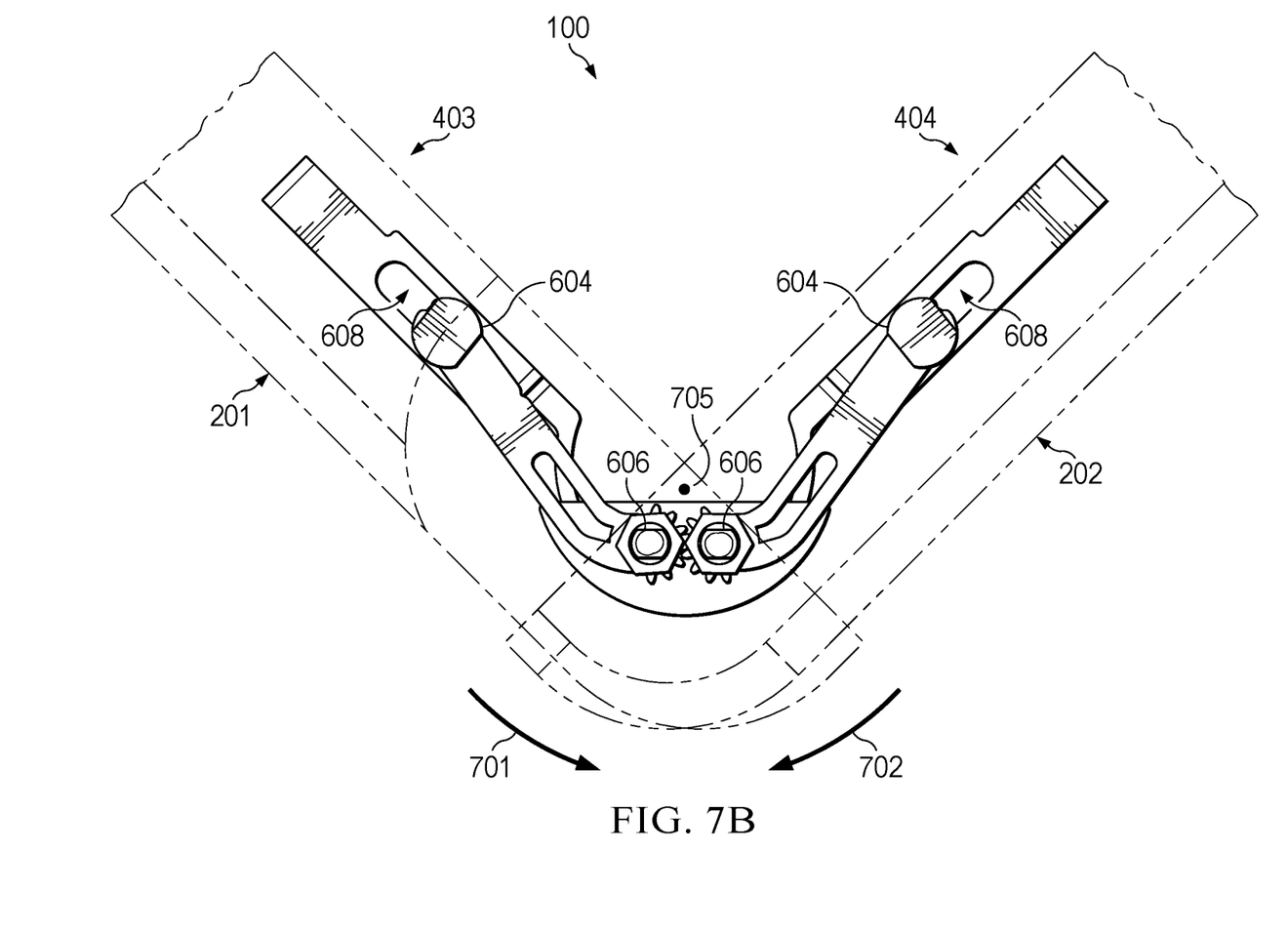
Figure 7C:
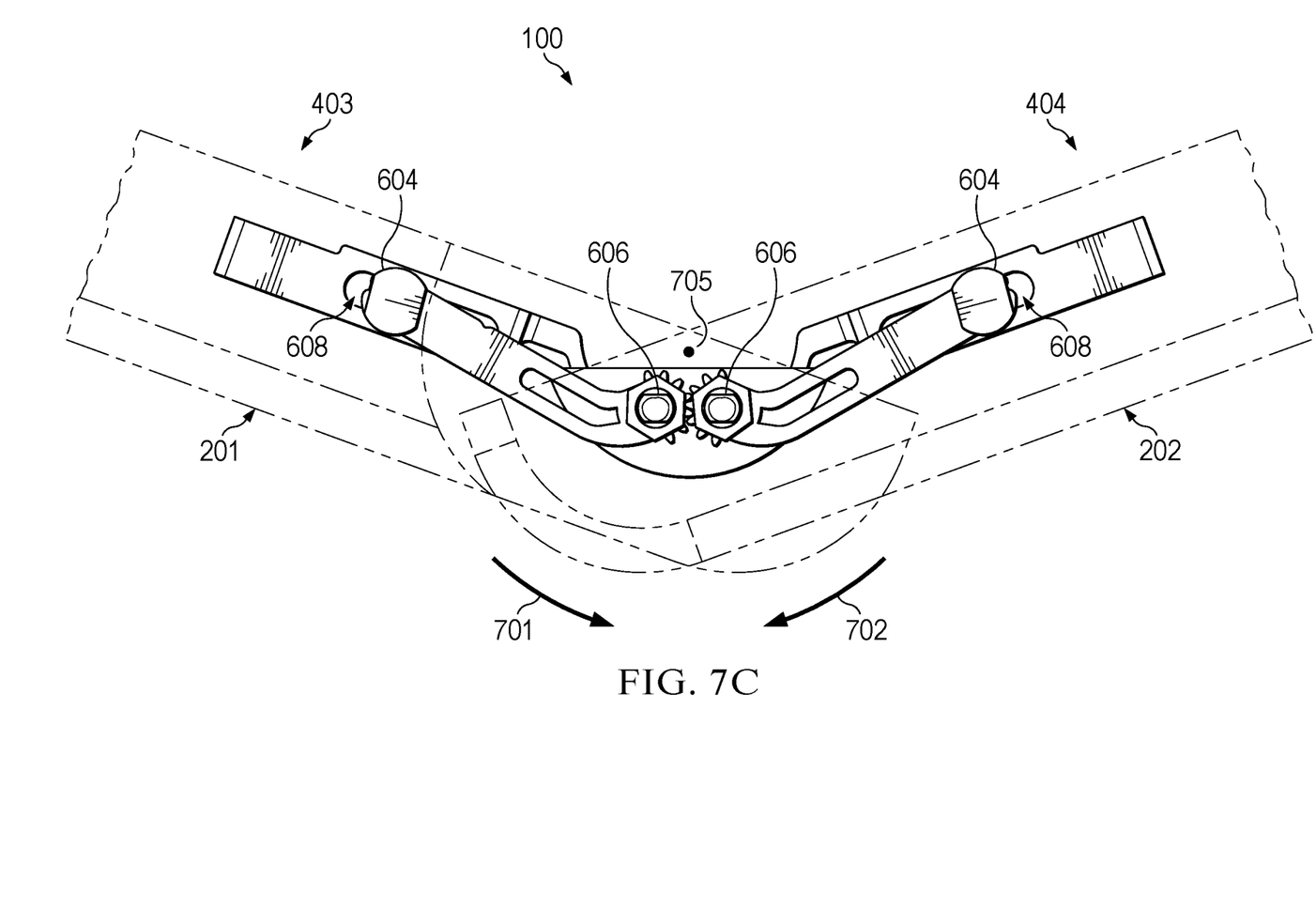
Figure 7D:
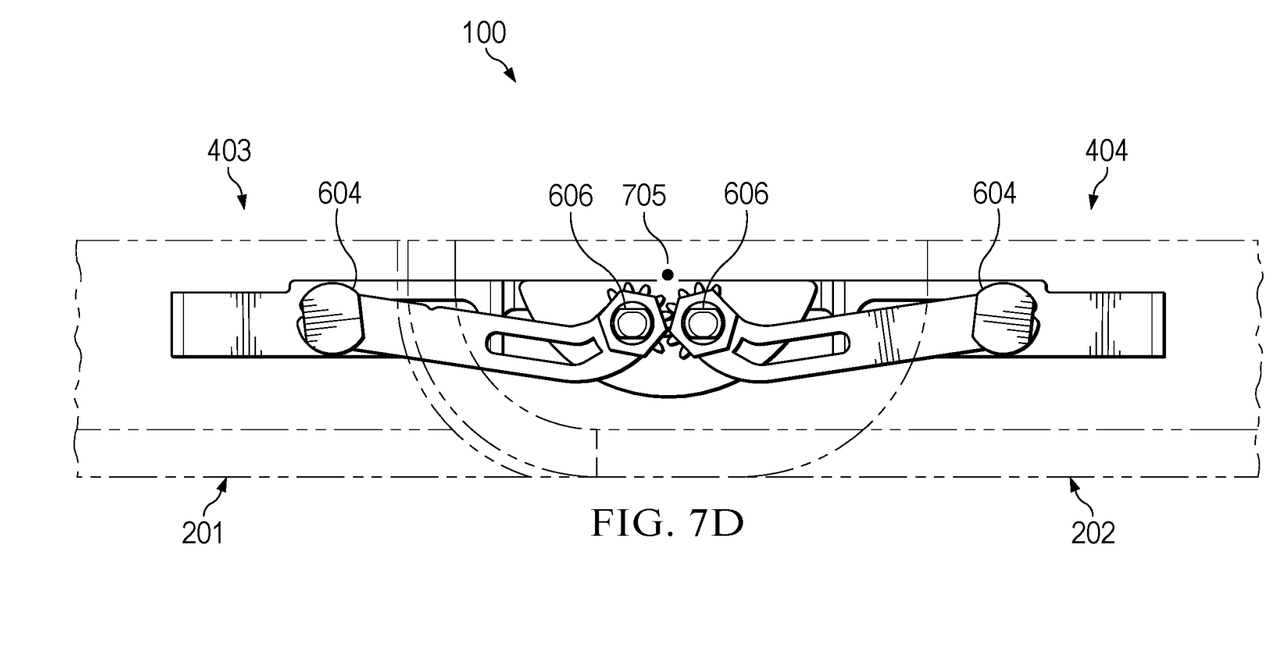

FIG. 7A depicts information handling system 100 and hinge assembly 203 in the closed position. As member 201 and member 202 begin to rotate in directions 701 and 702, respectively, around virtual hinge center 705, each secondary shaft 604 may begin to move from one end of its respective track 608 to the opposite end of its respective track 608. As shown in FIGS. 7B and 7C, as secondary shaft 604 moves from one end of track 608 to the opposite end of track 608, an edge of each of display assembly 403 and display assembly 404 may begin to move closer to each other. As shown in FIG. 7D, when member 201 has rotated approximately 180 degrees relative to member 202 or vice versa, each secondary shaft 604 may be positioned at the opposite end of track 608 from where each started when in the closed position. Accordingly, due to the presence of hinge assembly 203, information handling system 100 may be configured such that when member 201 has rotated approximately 180 degrees relative to member 202 or vice versa, the distance between an edge associated with display assembly 403 and an edge associated with display assembly 404 may be minimized such that display assembly 403 and display assembly 404 may appear substantially continuous. As depicted in FIGS. 7A-7D, hinge assembly 203 may be positioned beneath display assemblies 403 and 404 such that hinge assembly 203 is not visible. In other non-limiting embodiments, hinge assembly 203 may be enclosed by member 201 and member 202. Each of display assembly 403 and display assembly 404 may have an enclosure made from one or more suitable materials, including without limitation plastic, steel, and/or aluminum.

Although information handling system 100 is shown in FIGS. 7A-7D as having certain components (e.g., display assemblies 403 and 404 and hinge assembly 203), information handling system 100 may include any other suitable components, including but not limited to a keyboard assembly, which may not have been depicted in FIGS. 7A-7D for the purposes of clarity and exposition.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a first member;
   a second member; and
   one or more hinge assemblies for rotatably coupling the first member to the second member, wherein the one or more hinge assemblies comprises:
   a central assembly;
   a first orbit mechanism configured to mechanically couple to the first member;
   a second orbit mechanism configured to mechanically couple to the second member;
   a first pair of link bars;
   a first primary shaft rotatably coupling the first pair of link bars to the central assembly and mechanically coupling the first pair of link bars to each other;
   a first secondary shaft mechanically coupling the first pair of link bars to each other and rotatably coupling the first pair of link bars to the first orbit mechanism via a first track comprising an elongated opening formed through the first orbit mechanism which limits linear motion of the first secondary shaft relative to the first orbit mechanism, wherein an axis of rotation of the first primary shaft is generally parallel to an axis of rotation of the first secondary shaft;
   a second pair of link bars;
   a second primary shaft rotatably coupling the second pair of link bars to the central assembly and mechanically coupling the second pair of link bars to each other; and
   a second secondary shaft mechanically coupling the second pair of link bars to each other and rotatably coupling the second pair of link bars to the second orbit mechanism via a second track comprising an elongated opening formed through the second orbit mechanism which limits linear motion of the second secondary shaft relative to the second orbit mechanism, wherein an axis of rotation of the second primary shaft is generally parallel to an axis of rotation of the second secondary shaft.

2. The information handling system of claim 1, wherein: the first member comprises a first display assembly; and the second member comprises a second display assembly.

3. The information handling system of claim 2, wherein the one or more hinge assemblies is arranged such that, when the first display assembly is in an open position relative to the second display assembly, an edge of the first display assembly is sufficiently proximate to an edge of the second display assembly such that the first display assembly and second display assembly appear as a continuous display.

4. The information handling system of claim 1, wherein the first secondary shaft is configured to move from a first position within the first track when the first member is in a closed position relative to the second member to a second position within the first track when the first member is rotated to an open position relative to the second member.

5. The information handling system of claim 4, wherein the second secondary shaft is configured to move from a first position within the second track when the first member is in the closed position relative to the second member to a second position within the second track when the first member is rotated to the open position relative to the second member.

6. The information handling system of claim 4, wherein the closed position and the open position are approximately 180 degrees of rotation apart.

7. A hinge assembly for rotatably coupling a first member to a second member, the hinge assembly comprising:
   a central assembly;
   a first orbit mechanism configured to mechanically couple to the first member;
   a second orbit mechanism configured to mechanically couple to the second member;
   a first pair of link bars;
   a first primary shaft rotatably coupling the first pair of link bars to the central assembly and mechanically coupling the first pair of link bars to each other;
   a first secondary shaft mechanically coupling the first pair of link bars to each other and rotatably coupling the first pair of link bars to the first orbit mechanism via a first track comprising an elongated opening formed through the first orbit mechanism which limits linear motion of the first secondary shaft relative to the first orbit mechanism, wherein an axis of rotation of the first primary shaft is generally parallel to an axis of rotation of the first secondary shaft;
   a second pair of link bars;
   a second primary shaft rotatably coupling the second pair of link bars to the central assembly and mechanically coupling the second pair of link bars to each other; and
   a second secondary shaft mechanically coupling the second pair of link bars to each other and rotatably coupling the second pair of link bars to the second orbit mechanism via a second track comprising an elongated opening formed through the second orbit mechanism which limits linear motion of the second secondary shaft relative to the second orbit mechanism, wherein an axis of rotation of the second primary shaft is generally parallel to an axis of rotation of the second secondary shaft.

8. The hinge assembly of claim 7, wherein:
   the first member comprises a first display assembly; and
   the second member comprises a second display assembly.

9. The hinge assembly of claim 8, wherein the hinge assembly is arranged such that, when the first display assembly is in an open position relative to the second display assembly, an edge of the first display assembly is sufficiently proximate to an edge of the second display assembly such that the first display assembly and second display assembly appear as a continuous display.

10. The hinge assembly of claim 7, wherein the first secondary shaft is configured to move from a first position within the first track when the first member is in a closed position relative to the second member to a second position within the first track when the first member is rotated to an open position relative to the second member.

11. The hinge assembly of claim 10, wherein the second secondary shaft is configured to move from a first position within the second track when the first member is in the closed position relative to the second member to a second position within the second track when the first member is rotated to the open position relative to the second member.

12. The hinge assembly of claim 10, wherein the closed position and the open position are approximately 180 degrees of rotation apart.

13. A method for forming a hinge assembly for rotatably coupling a first member to a second member, comprising:
   mechanically coupling a first orbit mechanism to the first member;
   mechanically coupling a second orbit to the second member;
   rotatably coupling the first pair of link bars to a central assembly via a primary shaft;
   mechanically coupling the first pair of link bars to each other via the primary shaft;
   mechanically coupling the first pair of link bars to each other via a first secondary shaft;
   rotatably coupling the first pair of link bars to the first orbit mechanism via the first secondary shaft and a first track comprising an elongated opening formed through the first orbit mechanism which limits linear motion of the first secondary shaft relative to the first orbit mechanism, wherein an axis of rotation of the first primary shaft is generally parallel to an axis of rotation of the first secondary shaft;
   rotatably coupling the second pair of link bars to the central assembly via a second pair of link bars;
   mechanically coupling the second pair of link bars to each other via the second pair of link bars;
   mechanically coupling the second pair of link bars to each other via a second secondary shaft; and
   rotatably coupling the second pair of link bars to the second orbit mechanism via the second secondary shaft and a second track comprising an elongated opening formed through the second orbit mechanism which limits linear motion of the second secondary shaft relative to the second orbit mechanism, wherein an axis of rotation of the second primary shaft is generally parallel to an axis of rotation of the second secondary shaft.

14. The method of claim 13, wherein:
   the first member comprises a first display assembly; and
   the second member comprises a second display assembly.

15. The method of claim 14, further comprising arranging the hinge assembly such that, when the first display assembly is in an open position relative to the second display assembly, an edge of the first display assembly is sufficiently proximate to an edge of the second display assembly such that the first display assembly and second display assembly appear as a continuous display.

16. The method of claim 13, further comprising configuring the first secondary shaft to move from a first position within the first track when the first member is in a closed position relative to the second member to a second position within the first track when the first member is rotated to an open position relative to the second member.

17. The method of claim 16, further comprising configuring the second secondary shaft to move from a first position within the second track when the first member is in the closed position relative to the second member to a second position within the second track when the first member is rotated to the open position relative to the second member.

18. The method of claim 16, wherein the closed position and the open position are approximately 180 degrees of rotation apart.

* * * * *